(12) United States Patent
Guler et al.

(10) Patent No.: US 7,676,397 B2
(45) Date of Patent: Mar. 9, 2010

(54) METHOD AND SYSTEM FOR PREDICTING THE OUTCOME OF AN ONLINE AUCTION

(75) Inventors: Kemal Guler, Cupertino, CA (US); Francois Rene Paul Boulanger, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1186 days.

(21) Appl. No.: 10/726,432

(22) Filed: Dec. 3, 2003

(65) Prior Publication Data

US 2005/0144081 A1 Jun. 30, 2005

(51) Int. Cl.
*G06Q 30/00* (2006.01)

(52) U.S. Cl. .................... 705/26; 705/1; 705/27; 705/35

(58) Field of Classification Search .......... 705/26, 705/27, 37
See application file for complete search history.

(56) References Cited

U.S. PATENT DOCUMENTS

| | | | |
|---|---|---|---|
| 5,101,353 A * | 3/1992 | Lupien et al. ............... 705/37 |
| 6,285,989 B1 * | 9/2001 | Shoham ...................... 705/37 |
| 6,792,399 B1 * | 9/2004 | Phillips et al. ............ 705/36 R |
| 6,868,525 B1 * | 3/2005 | Szabo ........................ 715/738 |
| 6,871,190 B1 * | 3/2005 | Seymour et al. ............. 705/37 |
| 6,892,186 B1 * | 5/2005 | Preist ......................... 705/37 |
| 2002/0082977 A1 * | 6/2002 | Hammond et al. ........... 705/37 |
| 2002/0099643 A1 * | 7/2002 | Abeshouse et al. .......... 705/37 |
| 2002/0174052 A1 * | 11/2002 | Guler et al. ................. 705/37 |
| 2003/0014346 A1 * | 1/2003 | Zhang ........................ 705/37 |
| 2003/0041002 A1 * | 2/2003 | Hao et al. ................... 705/37 |
| 2004/0010461 A1 * | 1/2004 | Boutilier .................... 705/37 |
| 2005/0033648 A1 * | 2/2005 | Jin et al. ..................... 705/26 |
| 2005/0102215 A1 * | 5/2005 | Ausubel et al. ............. 705/37 |
| 2005/0114225 A1 * | 5/2005 | Longman et al. ............ 705/26 |
| 2006/0085321 A1 * | 4/2006 | Staib et al. .................. 705/37 |

OTHER PUBLICATIONS

Patrick Bajari and Ali Hortacsu, Auction Models When Bidders Make Small Mistakes: Consequences for Theory and Estimation, Aug. 15, 2001, Stanford University and University of Chicago.*

* cited by examiner

*Primary Examiner*—Jason Dunham

(57) ABSTRACT

A method and related system for predicting, possibly a software program executing on a computer system, an online auction outcome for each of a plurality of feedback rules.

13 Claims, 3 Drawing Sheets

US 7,676,397 B2

METHOD AND SYSTEM FOR PREDICTING THE OUTCOME OF AN ONLINE AUCTION

BACKGROUND

An entity that manages an auction may choose to hold an auction that implements one of a variety of available auction formats. Each auction format may have different feedback rules, defined as the set of rules that determine the information revealed to the bidders, as well as when and how the information is revealed. The feedback rules of each auction format may affect bidder behavior by influencing entry/participation decisions, bidding decisions and incentives for bidder collusion, thus affecting auction outcome. The consequences for adopting inappropriate feedback rules may be detrimental. Thus, the selection of a proper format for a particular auction is desirable.

SUMMARY

The problems noted above are solved in large part by a method and system for predicting online auction outcomes. One of the exemplary embodiments is a method that comprises providing information regarding an online auction to a computer system, and predicting (by a software program executing on the computer system) an auction outcome for each of the plurality of potential feedback rules for the online auction.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
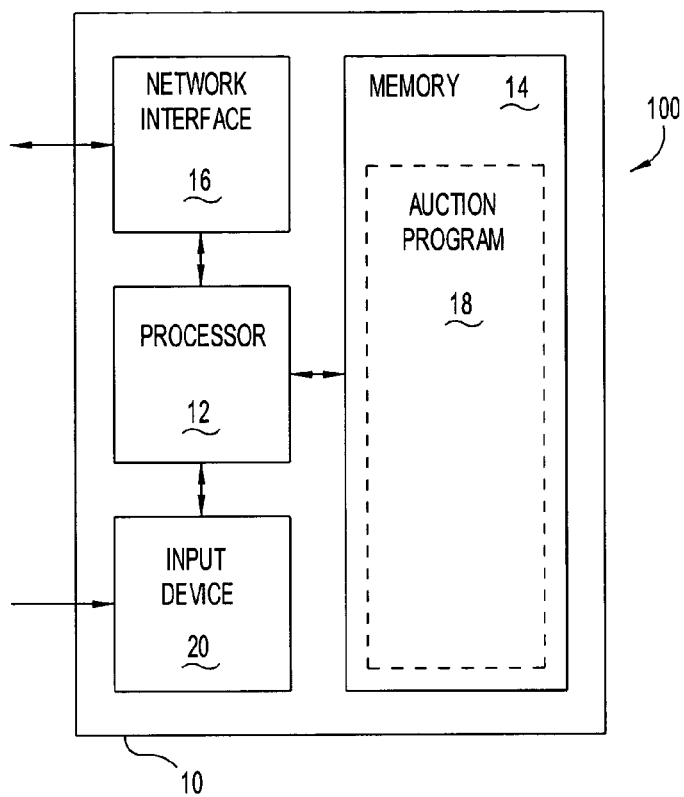
FIG. 1 illustrates an auction system in accordance with embodiments of the invention.

FIG. 1 illustrates a block diagram of an auction system 100 in accordance with embodiments of the invention. The auction system 100 may comprise a computer 10 having a CPU or processor 12 coupled to a memory 14 and a network interface 16. The memory 14 may store an auction program 18 comprising computer-readable instructions. Various submodules of the auction program 18 will be discussed more fully below. The memory 14 may be any of a variety of suitable instruction storage mediums, such as a floppy disk, a compact disk, a volatile memory, a non-volatile memory, a hard drive, or a combination thereof. The instructions comprising the auction program 18 may be written in any of a variety of computer languages such as C, C++, Java, Pearl, or Visual Basic. Moreover, portions of the auction program 18 may be implemented as commands in external software, such as Microsoft® Excel®.

Computer system 10 may further comprise an input device 20 coupled to the processor 12 and remaining computer system components. The input device 20 may comprise any of a variety of devices, such as a keyboard, a mouse, and a voice recognition system.

Figure 2:
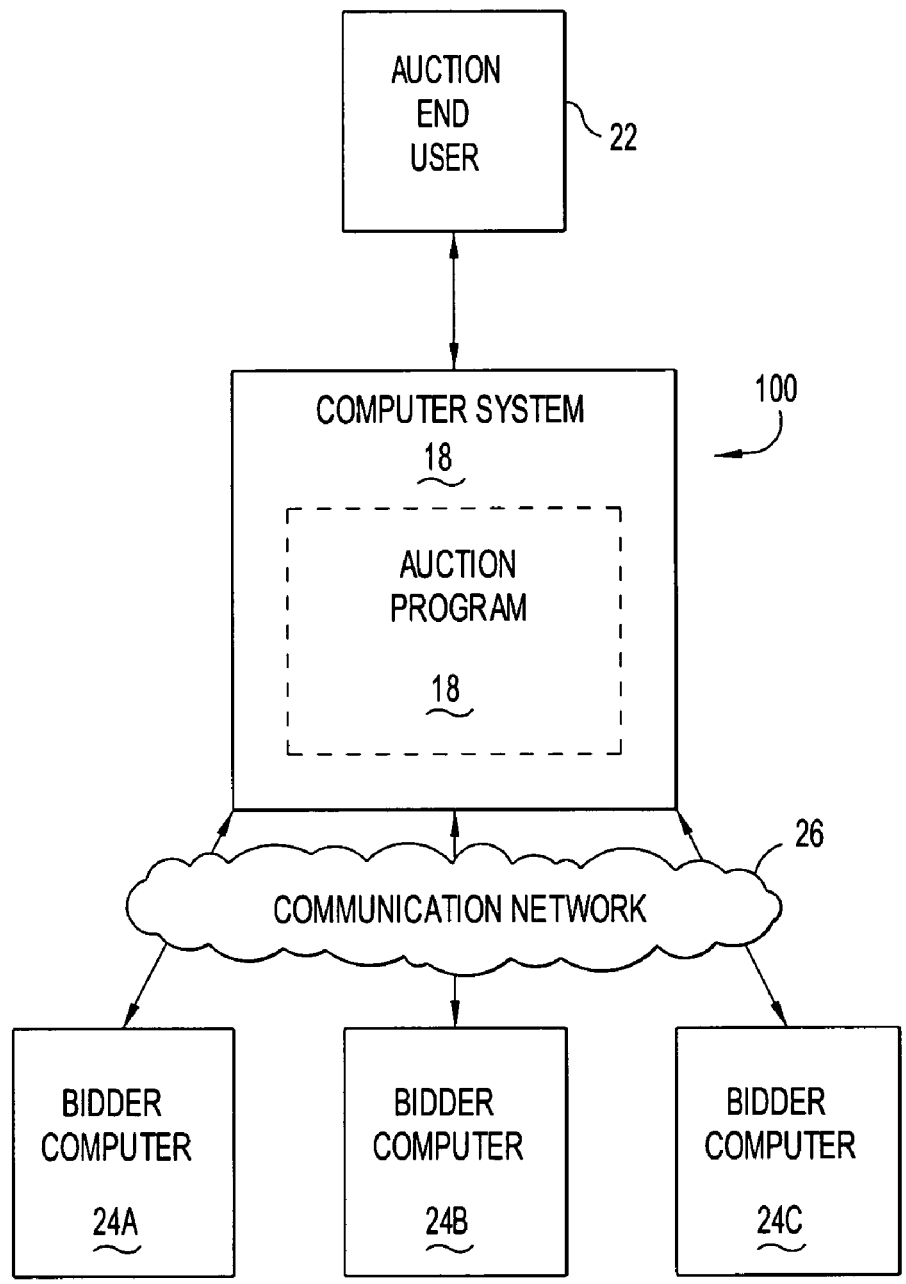
FIG. 2 illustrates an online auction in accordance with embodiments of the invention.

As an example of a situation in which auction system 100 may be used, consider an auction end-user who wishes to hold an online auction to sell an item. FIG. 2 illustrates components that may be used to conduct and/or participate in the online auction. In at least some embodiments, the auction end-user 22 may access and provide input to the auction program 18 through the network interface 16 (FIG. 1) of the computer system 10. Alternatively, the auction end-user 22 may write input to the auction program 18 by way of the input device 20 (FIG. 1) of the computer system 10. Regardless of the mechanism by which the auction end-user 22 communicates with the auction program 18, the auction end-user 22 may input auction details such as the auction end-user's identity, item(s) to be auctioned, the desired method of payment, start-time for the auction, end-time for the auction, and/or minimum or maximum bid increments. In accordance with at least some embodiments of the invention, the auction program 18 may select an appropriate feedback method for the auction based at least in part on the auction details provided by the auction end-user. In alternative embodiments of the invention, the auction program may calculate and provide a ranking for each available feedback rule, and allow the auction end-user 22 to select a feedback rule. After a feedback rule is selected (whether by the auction program 18 or by the auction end-user 22 based on the evaluation criteria), the auction program 18 may then conduct an online auction.

Still referring to FIG. 2, during an active time of the online auction, bidders may view the details of the auction and bid on the item to be auctioned, possibly through bidder computers 24 coupled to the auction system 100 by way of a communication network 26. Each bidder may be provided feedback regarding the auction, with the amount and type of feedback depending on the type of feedback rule selected. Feedback may be provided by the auction program 18 sending data to each bidder computer 24 through the communication network 26.

There may be a plurality of auction types that may be carried out by the auction program 18. In a first auction type, hereinafter called a "forward auction," the bidder that offers the highest bid within a fixed time wins the auction. In a second auction type, hereinafter called a "reverse auction," the party that offers the lowest bid within a fixed time wins the auction. In both the forward auctions and the reverse auctions, what a bidding party knows regarding other bids may affect the bids in the auction.

Feedback rules, e.g., rules that control the timing, type and content of the feedback, may significantly affect the bids in the auction. An auction system with a fixed and limited set of feedback rules may not achieve the result desired by the party placing an item up for bid. Specifically, a party offering to sell an item may not receive as much revenue as desired (forward auction), or a party seeking to buy services may not reduce purchasing costs as much as desired (reverse auction).

There may be a plurality of feedback rules that may be evaluated by the auction program 18 and selected (either by the auction program 18 or by the auction end-user 22). A first feedback rule may be a "No Feedback" rule, where no information may be provided to the bidders during the auction. Another feedback rule may be a "Full Disclosure" rule, where all current bids are disclosed to each bidder, and possibly including identification of each bidder. Yet another feedback rule may be a "Lowest K Bid" rule, where the lowest K bids are revealed. For example, if K=3, then the lowest three bids are revealed. Yet another feedback rule may be a "Rank Among the Lowest Bid" rule, where a bidder may be informed of bid rank only if the bidder's rank is among the lowest K bids, otherwise the bidder may be informed only that his current bid is above the Kth lowest bid. Yet another feedback rule may be the "Whether Among the Lowest K Bid" rule, where a bidder may be informed whether or not his bid is among the lowest K bids submitted. In an auction where multiple winners are allowed, the "Lowest K Bid" rule may inform a bidder whether the bidder's current bid is one of the winning bids. Yet another type of feedback rule may be a "Lowest Bid and Number of Bids" rule, where only the dollar value of the lowest bid, and the number of bidders, may be revealed. Yet another feedback rule may be the "Rank-Only" rule, where a bidder is informed of the bidder's rank among all the bids submitted in the auction. Yet another feedback rule may be a "Next Horse" rule, where a bidder may be informed of the bidder's rank and the next-most competitive bid. For each of the feedback rules discussed above involving disclosure with regard to the lowest bid (for reverse auctions), there is a corresponding set of feedback rules regarding highest bid (for forward auctions).

Figure 3:
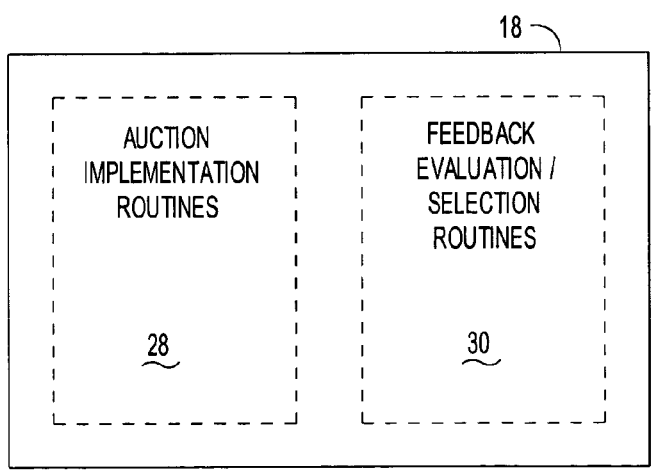
FIG. 3 illustrates an auction program in accordance with embodiments of the invention.

In accordance with embodiments of the invention, auction program 18 may evaluate each of the plurality of feedback rules above, as well as others, to determine an optimal feedback rule for a particular auction type. FIG. 3 illustrates components of auction program 18 in greater detail. In particular, FIG. 3 illustrates that the auction program 18, for purposes of this disclosure, comprises two major components: auction implementation routines 28; and feedback evaluation/selection routines 30. The auction implementation routines may be responsible for conducting an online auction, such as accepting user bids, sending out feedback information and selecting a winning bidder. Feedback evaluation/selection routines 30, in accordance with embodiments of the invention, may be responsible for evaluating each of the possible feedback rules. The evaluation may result in providing information to an auction end-user 22 to assist the auction end-user in selecting a feedback rule, or alternatively the feedback evaluation/selection routines may automatically select a feedback appropriate for the situation.

Figure 4:
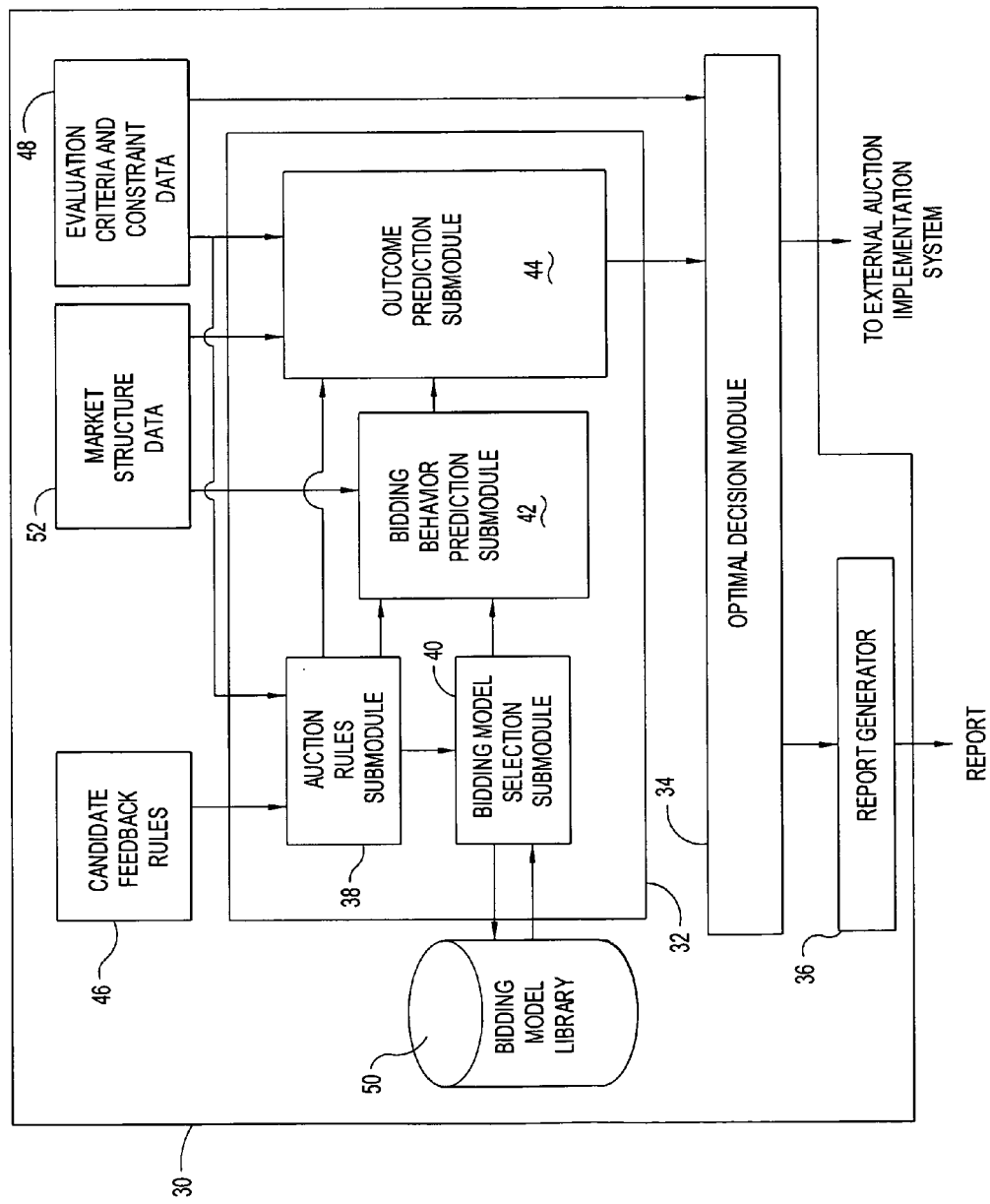
FIG. 4 illustrates in greater detail the auction program of FIG. 3, in accordance with embodiments of the invention.

FIG. 4 illustrates in greater detail various possible sub-modules and databases comprising the feedback evaluation/selection routines 30. In accordance with embodiments of the invention, the two major portions of the feedback evaluation/selection routines 30 may be the feedback rule evaluation module 32 and the optimal decision module 34. The feedback rule evaluation module 32 may be the routines responsible for evaluating information from a plurality of sources (discussed more fully below), and passing to the optimal decision module 34 a predicted outcome for each available feedback rule.

The optimal decision module 34 may take as input the predicted outcome for each available feedback rule, and further may rank various feedback rules using the information provided. This ranking may be ordered starting with the feedback rule most appropriate for a particular auction, and ending with a feedback rule least appropriate for a particular auction, or vice versa. The rankings generated by the optimal decision module may be passed to the auction end-user by way of a report generator module 36. Alternatively, the auction program 18 may select and implement the most appropriate feedback rule.

With the broad aspects of the major components in mind, and still referring to FIG. 4, attention is now turned to the various sub-modules that comprise the feedback rule evaluation module 32. In accordance with embodiments of the invention, the feedback rule evaluation module 32 comprises four sub-modules: auction rule sub-module 38; bidding model selection sub-module 40; bidding behavior prediction sub-module 42; and outcome prediction sub-module 44. Each of these will be discussed in turn.

Auction rules sub-module 38, as a component part of the feedback rule evaluation module 32, may be responsible for determining, at a high level, which candidate feedback rules may be applicable to the particular auction. In particular, the auction rule sub-module 38 may read a plurality of candidate feedback rules 46, along with evaluation criteria and constraint data 48, and make a determination regarding which feedback rules may be applicable to the particular situation. For example, if the auction to be executed is a forward auction, then feedback rules related to providing information regarding the lowest bids may not be applicable. Thus, the auction rule sub-module 38 pares the list of candidate feedback rules 46 based on the evaluation criteria and constraint data 48. The pared list of candidate feedback rules are referred to as the potential feedback rules. The potential feedback rules may then be provided to one or both of the bidding model selection sub-module 40 and the bidding behavior prediction sub-module 42.

Still referring to FIG. 4, the bidding module selection sub-module 40 may take the list of potential feedback rules generated by the auction rule sub-module 38 and associate a bidding model with each potential feedback rule. That is, the bidding model selection sub-module 40 may access a plurality of bidding models, i.e., models that predict bidding behavior based on feedback type, stored in a bidding model library 50. The bidding model selection sub-module 40 may thus provide the bidding models for each potential feedback rule to the bidding behavior prediction sub-module 42.

The bidding behavior prediction sub-module 42 may take as input the potential feedback rules produced by the auction rule sub-module 38, and the associated bidding models from the bidding model selection sub-module 40. Using the information provided from the sub-modules 38 and 40, along with the market structure data 52, the bidding behavior prediction sub-module 42 completes the bidding models for each potential feedback rule. Market structure data 52 may comprise information provided by the auction end-user, such as the cost of auction items or services, production and delivery cost, the number of items or services involved in the auction, information regarding suppliers or consumers in a particular market, and/or any other estimates or data provided by the auction end-user. Thus, the bidding behavior prediction sub-module 42 completes the bidding models passed to the bidding model selection sub-module 40 with market-specific information so that the outcome can be modeled by the outcome prediction sub-module 44.

Outcome prediction sub-module 44 takes the completed bidding models produced by the bidding behavior prediction sub-module for each potential feedback rule, along with the evaluation criteria and constraint data 48, and predicts an outcome for each model associated with each potential feedback rule. In some embodiments, the outcome prediction sub-module 44 may calculate a single predicted outcome for each bidding model and associated potential feedback rule. Since multiple bidding models may be associated with each potential feedback rule, and further since there may be multiple potential feedback rules, the outcome prediction sub-module 44 may produce a plurality of predicted outcomes. For example, if the auction is a reverse auction, the outcome prediction sub-module 44 may produce a predicted winning bid for each bidding model(s) associated with each potential feedback rule.

In alternative embodiments of the invention, the outcome prediction sub-module 44 may produce a statistical distribution of predicted outcomes for each bidding model and associated potential feedback rule. That is, each combination of a bidding model and potential feedback rule may produce a statistical distribution of possible outcomes, in a bell-shaped curve, thus predicting the probability of a plurality of possible outcomes within each bidding model and associated potential feedback rule. Regardless of whether a single predicted outcome or a statistical distribution predicted outcome is calculated by the outcome prediction sub-module 44, the information generated by the outcome prediction sub-module 44 may be passed to the optimal decision module 34.

In accordance with some embodiments of the invention, the optimal decision module 34 may take the results of the outcome prediction module 44 and select an appropriate feedback rule to be used in the online auction. In embodiments where the outcome prediction sub-module 44 predicts a single outcome, the optimal decision module may thus select the feedback rule that produces the most appropriate outcome for the type of auction. For a forward auction, the optimal decision module 34 may select the feedback rule where the model predicts the highest dollar amount for the auctioned item. For reverse auctions, the optimal decision module may select a feedback rule where the model predicts the lowest cost for the services sought. In embodiments where the outcome prediction sub-module 44 produces a statistical distribution of outcomes for each combination of bidding model and potential feedback rule, the optimal decision module 34 may select a feedback rule having a statistical distribution most favorable to the auction end-user. Thus, if two combinations of a bidding model and a feedback rule produce distributions having the same mean but differing standard deviations, the optimal decision module 34 may select the feedback rule having the smallest standard deviation. The feedback rule where the model predicts a smaller standard deviation is more likely to produce a desirable result for the auction end-user.

In accordance with alternative embodiments of the invention, the optimal decision module 34 makes recommendations to the auction end-user for selection. In these embodiments, the optimal decision module 34 may rank the various feedback rules, and pass the rankings to report generator 36. The report generator 36 may then provide the information to the auction end-user. In embodiments where a single outcome may be predicted, ranking may be as simple as ordering the feedback rules based on their predicted outcome, most desirable to least desirable. In embodiments where the outcome prediction sub-module 44 produces a statistical distribution for each bidding rule and feedback rule, the optimal decision module may rank the various feedback rules according to their means, and for outcomes having substantially the same mean, according to their standard deviation.

In the alternative embodiments where a ranking is provided to the auction end-user, the end-user may also be supplied with information about the particular bidding model used in modeling an outcome, to aid the end-user in making a selection.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   providing information regarding an online auction type to a computer system; and
   predicting, by a software program executing on the computer system, an auction outcome for each of a plurality of potential feedback rules for the online auction type;
   allowing an auction end-user to select a feedback rule to implement from the plurality of potential feedback rules based on the predicted auction outcomes; and
   implementing a single auction using the feedback rule selected by the end-user.

2. The method as defined in claim 1 wherein predicting further comprises modeling an outcome for each of the plurality of potential feedback rules.

3. The method as defined in claim 2 wherein modeling the outcome for each of the plurality of potential feedback rules further comprises calculating a statistical distribution of possible outcomes for each of the plurality of potential feedback rules.

4. The method as defined in claim 1 wherein the predicting further comprises:
   ranking, by the software program, each of the plurality of potential feedback rules based on the predicted outcomes; and
   providing the ranking to the auction end-user.

5. A computer system comprising:
   a processor; and
   a non-volatile memory coupled to the processor and storing an auction program;
   wherein the processor executes the auction program stored on the non-volatile memory and wherein the auction program, prior to implementing an auction of a particular auction type, predicts an auction outcome for each of a plurality of feedback rules for the particular auction type; and
   wherein the processor, executing the auction program, selects one of the plurality of feedback rules to implement based on the predicted auction outcomes.

6. The computer system as defined in claim 5 wherein the processor, executing the auction program, models a plurality of outcomes for an auction, one each for each of the plurality of feedback rules.

7. The computer system as defined in claim 6 wherein the processor predicts a final outcome for each of the plurality of feedback rules.

8. The computer system as defined in claim 6 wherein the processor calculates a statistical distribution of outcomes for each of the plurality of feedback rules.

9. A computer readable media storing instructions executable by a computer system, and when executed the instructions implement a method comprising:
- accepting parameters of an online auction from an auction end-user;
- modeling, for a particular auction type and for each of a plurality of feedback rules, an auction outcome using, at least in part, the parameters supplied by the auction end-user; and then
- holding an online auction based on the parameters of the online auction and using one of the plurality of feedback rules selected based on the modeling and selected by the instructions executed by the computer program based on the modeling.

10. The computer readable media as defined in claim 9 wherein modeling, for each of the plurality of feedback rules, the auction outcome further comprises calculating a statistical distribution of possible outcomes for each of the plurality of feedback rules.

11. The computer readable media as defined in claim 10 further comprising, before the holding step:
- providing the statistical distributions of possible outcomes for each of the plurality of feedback rules to the auction end-user.

12. The computer readable media as defined in claim 11 wherein the providing step further comprises:
- ranking each of the plurality of feedback rules based on statistical distributions of possible outcomes.

13. A computer system comprising:
- a means for reading and executing programs; and
- a means for storing an auction program coupled to the means for reading and executing;
- wherein prior to holding an online auction the means for reading and executing programs executes the auction program stored on the means for storing, predicts an auction outcome for each of a plurality of potential feedback rules for an auction of a particular type, and selects one of the plurality of feedback rules to implement based on the predicted auction outcomes.

* * * * *